United States Patent
Kini et al.

(10) Patent No.: US 8,880,334 B2
(45) Date of Patent: Nov. 4, 2014

(54) MACHINE CONTROL SYSTEM HAVING AUTONOMOUS EDGE DUMPING

(71) Applicant: Caterpillar Inc., Peoria, IL (US)

(72) Inventors: Anath P. Kini, Washington, IL (US);
Joshua C. Struble, Chillicothe, IL (US);
Andrew J. Vitale, Peoria, IL (US);
Craig L. Koehrsen, East Peoria, IL (US); Bryan J. Everett, Peoria, IL (US);
Mark H. C. Banham, Queensland (AU);
Dean G. Povey, Queensland (AU);
Matthew A. Holmes, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 24 days.

(21) Appl. No.: 13/752,262

(22) Filed: Jan. 28, 2013

(65) Prior Publication Data

US 2014/0214235 A1    Jul. 31, 2014

(51) Int. Cl.
*G01C 21/00* (2006.01)
*G05D 1/00* (2006.01)

(52) U.S. Cl.
CPC .................................. *G05D 1/0027* (2013.01)
USPC ............................................ 701/411; 701/23

(58) Field of Classification Search
USPC ................................................... 701/23, 411
See application file for complete search history.

(56) References Cited

U.S. PATENT DOCUMENTS

| | | | |
|---|---|---|---|
| 5,913,914 A | 6/1999 | Kemner et al. | |
| 5,931,875 A | 8/1999 | Kemner et al. | |
| 5,968,103 A | 10/1999 | Rocke | |
| 6,236,039 B1 | 5/2001 | Lee | |
| 6,502,016 B1 | 12/2002 | Ozaki et al. | |
| 6,668,157 B1 | 12/2003 | Takeda et al. | |
| 7,966,106 B2 | 6/2011 | Sudou et al. | |
| 8,467,943 B2* | 6/2013 | Dersjo et al. | 701/50 |
| 2003/0111892 A1 | 6/2003 | Neilson et al. | |
| 2005/0096183 A1* | 5/2005 | Watanabe et al. | 477/182 |
| 2008/0195365 A1* | 8/2008 | Ohkura et al. | 703/8 |
| 2009/0048064 A1* | 2/2009 | Tanaka et al. | 477/3 |
| 2009/0216410 A1 | 8/2009 | Allen et al. | |
| 2012/0136523 A1* | 5/2012 | Everett et al. | 701/24 |
| 2013/0035978 A1* | 2/2013 | Richardson et al. | 705/7.27 |
| 2014/0019042 A1* | 1/2014 | Sugawara et al. | 701/431 |
| 2014/0095006 A1* | 4/2014 | Saito et al. | 701/22 |

OTHER PUBLICATIONS

U.S. Patent Application of Ananth P. Kini et al., entitled "Machine Control System Having Autonomous Edge Dumping" filed on Jan. 28, 2013.

* cited by examiner

*Primary Examiner* — Hussein A. Elchanti
(74) *Attorney, Agent, or Firm* — Finnegan, Henderson, Farabow, Garrett & Dunner LLP

(57) ABSTRACT

A control system is disclosed for use with a plurality of machines operating at a worksite. The control system may have a plurality of communicating devices, and a plurality of onboard controllers, each mountable to the plurality of machines. The control system may also have an offboard controller in communication with the plurality of onboard controllers via the plurality of communicating devices. The offboard controller may be configured to selectively assign each of a plurality of sequentially arranged dump targets for use by each of the plurality of machines based on an order in which the plurality of machines arrive at a dump location. The offboard controller may be further configured to make a determination that lanes extending to two dump targets of the plurality of sequentially arranged dump targets overlap, and selectively skip assignment of one of the two dump targets based on the determination.

20 Claims, 7 Drawing Sheets

US 8,880,334 B2

MACHINE CONTROL SYSTEM HAVING AUTONOMOUS EDGE DUMPING

TECHNICAL FIELD

The present disclosure relates generally to an autonomous machine control system, and more particularly, to a system for autonomously controlling edge dumping of mobile machines.

BACKGROUND

Mobile machines, such as haul trucks and other types of heavy equipment, are often used to haul material from a load location at which the material is loaded into the machines, to a dump location at which the material is discharged from the machines. In order to maintain productivity and efficiency at a worksite while accomplishing predetermined site goals, travel of the machines at the dump location and positioning of the discharge material should be carefully managed. The need to properly manage the machines at the dump location can become even more important when the machines are working in high-wall operations and are autonomously controlled.

One attempt to control mobile machines at a high-wall operation is described in U.S. Pat. No. 7,966,106 (the '106 patent) issued to Sudou et al. on Jun. 21, 2011. In particular the '106 patent describes a control system for guiding travel of unmanned haul trucks to dump earthen material over a high wall at multiple target locations. The control system begins by receiving a manual survey of an inward edge of a berm that bounds a dump area at a lip of the high wall. A discharge range along the surveyed edge is selected for use, and points are then plotted within the discharge range along the surveyed edge at regular intervals. A normal line (i.e., a line normal to the surveyed edge) is then drawn at each point that extends inward away from the berm a predetermined distance. A parallel line (i.e., a line parallel to the surveyed edge of the berm) is drawn to pass through inward ends of each of the normal lines. The parallel line is then smoothed to create a continuous curve. A starting point is selected on the curve, and another point spaced a predetermined distance from the starting point along the curve is paired with the starting point. A straight line is extended between the paired points, and a trajectory line is extended back toward the berm from a center of the straight line a predetermined distance to end at a dump target. An autonomous mining truck is then guided along each trajectory line until either the dump target is aligned with a center point of a rear axle of the truck or until the berm edge is detected by sensors on the truck. The truck is then stopped and dumping commences.

Although the system of the '106 patent is alleged to help manage dumping at a high-wall edge, the system may be less than optimal. That is, the system of the '106 patent may be complex and inefficient. Specifically, the smoothing operation used to create the continuous curve may be computationally demanding, requiring expensive processing equipment and resulting in delayed control. And the curve, in combination with dump targets always being located a predetermined distance away from the curve, may not account for irregularities in berm contour. By not accounting for these irregularities, it may be possible to dump material before an associated truck has reached the edge of the high wall or for the truck to continuously bump into the berm. Material dumped inside of the berm must then be removed by another machine, resulting in decreased productivity and increased operating costs. Continuously bumping into the berm could also weaken the berm.

The disclosed control system is directed to overcoming one or more of the problems set forth above and/or other problems of the prior art.

SUMMARY

In one aspect, the present disclosure is directed to a control system for use with a plurality of machines operating at a worksite. The control system may include a plurality of communicating devices, each mountable to a different one of the plurality of machines; and a plurality of onboard controllers, each also mountable to a different one of the plurality of machines. The control system may also include an offboard controller in communication with the plurality of onboard controllers via the plurality of communicating devices. The offboard controller may be configured to selectively assign each of a plurality of sequentially arranged dump targets for use by each of the plurality of machines based on an order in which the plurality of machines arrive at a dump location. The offboard controller may be further configured to make a determination that lanes extending to two dump targets of the plurality of sequentially arranged dump targets overlap, and selectively skip assignment of one of the two dump targets based on the determination.

In another aspect, the present disclosure is directed to a method of controlling a plurality of machines operating at a worksite. The method may include selectively assigning each of a plurality of sequentially arranged dump targets for use by each of the plurality of machines based on an order in which the plurality of machines arrive at a dump location. The method may also include making a determination that lanes extending to two dump targets of the plurality of sequentially arranged dump targets overlap, and selectively skipping assignment of one of the two dump targets based on the determination.

DETAILED DESCRIPTION

Figure 1:
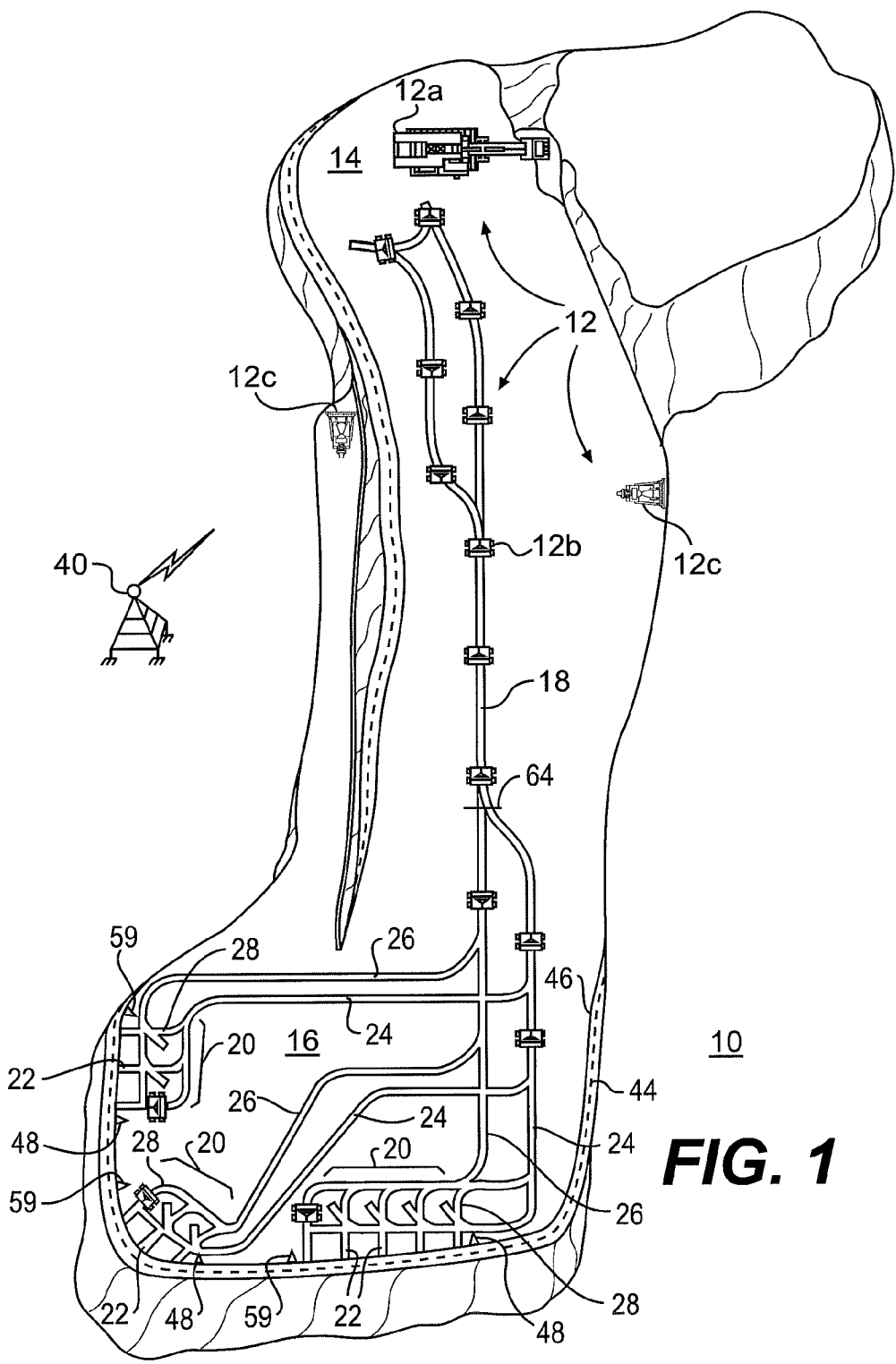
FIG. 1 is a pictorial illustration of an exemplary disclosed worksite.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, a dumping operation, or any other type of operation that functions to alter the current geography at worksite 10.

Worksite 10 may include multiple locations designated for particular purposes. For example, a first location 14 may be designated as a load location, at which a mobile loading machine 12a or other resource operates to fill multiple mobile haul machines 12b with material. A second location 16 may be designated as a dump location, at which haul machines 12b discharge their payloads. In the disclosed embodiment, second location 16 is positioned at an edge of a steep incline or cliff area known as a "high wall". In this embodiment, mobile haul machines 12b may be tasked with discharging their payloads over the edge or crest of the high wall. Accordingly, worksite 10 may be a considered a "high-wall operation".

Haul machines 12b may follow a main travel path 18 that generally extends between load and dump locations 14, 16. One or more additional mobile dozing, grading, or other cleanup machines 12c at worksite 10 may be tasked with clearing or leveling load location 14, dump location 16, and/or main travel path 18 such that travel by other machines 12 at these locations may be possible. As machines 12 operate at worksite 10, the shapes, dimensions, and general positions of load location 14, dump location 16, and travel path 18 may change. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator. In the disclosed embodiment, at least some of machines 12 at worksite 10 are autonomously controlled.

Dump location 16 may be divided into groupings 20 of dump targets 22 at which haul machines 12b should discharge their loads. Each grouping 20 may be assigned a dedicated entrance path 24 and a dedicated exit path 26 that connect at first ends with main travel path 18, and individual travel lanes 28 that extend between each dump target 22 and opposing second ends of the corresponding entrance and exit paths 24, 26. It is contemplated that dump location 16 may have any number of groupings 20. By having multiple groupings 20 at dump location 16, more than one haul machine 12b may be operational at dump location 16 at the same time without causing traffic problems and significant time delays along entrance and exit paths 24, 26.

Figure 2:
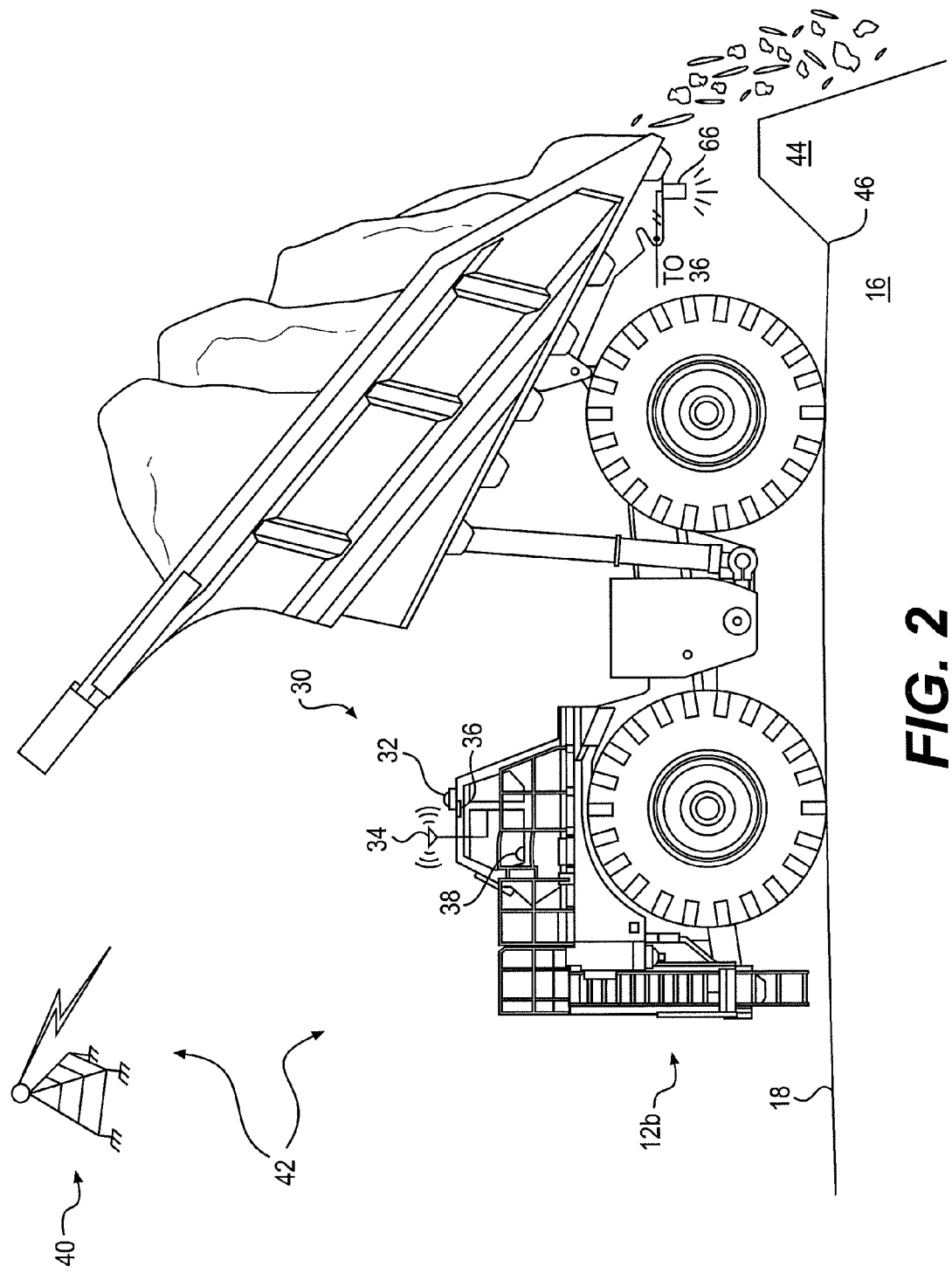
FIG. 2 is a pictorial illustration of an exemplary disclosed control system that may be used at the worksite of FIG. 1.

As shown in FIG. 2, each haul machine 12b may be equipped with a control module 30 that facilitates or enhances autonomous and/or human control of machine 12. Control module 30 may include, among other things, a locating device 32, a communicating device 34, and an onboard controller (OC) 36 connected to locating device 32 and communicating device 34. When intended for use with a manually operated machine 12, control module 30 may additionally include one or more operator interface devices 38. Operator interface devices 38 may include, for example, an input device such as a joystick, keyboard, steering wheel, pedal, lever, button, switch, etc. Alternatively or additionally, operator interface devices 38 may include a display device, such as a monitor, if desired.

Locating device 32 may be configured to determine a position of haul machine 12b at worksite 10 and generate a signal indicative thereof. Locating device 32 could embody, for example, a Global Positioning System (GPS) device, an Inertial Reference Unit (IRU), a local tracking system, or any other known locating device that receives or determines positional information associated with haul machine 12b. Locating device 32 may be configured to convey a signal indicative of the received or determined positional information to OC 36 for processing. It is contemplated that the location signal may also be directed to one or more of interface devices 38 (e.g., to the monitor) for display of machine location in an electronic representation of worksite 10, if desired.

Communicating device 34 may include hardware and/or software that enables sending and receiving of data messages between OC 36 and an offboard worksite controller (OWC) 40. OWC 40, together with each control module 30 of haul machines 12b, may embody a control system 42. The data messages associated with control system 42 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communicating device 34 to exchange information between OWC 40 and the components of control module 30.

Based on information from locating device 32 and instructions from OWC 40, each OC 36 may be configured to help regulate movements and/or operations of its associated haul machine 12b (e.g., direct movement of associated traction devices, brakes, work tools, and/or actuators; and operations of associated engines and/or transmissions). OC 36 may be configured to autonomously control these movements and operations or, alternatively, provide instructions to a human operator of haul machine 12b regarding recommended control. OC 36 may also be configured to send operational information associated with components of haul machine 12b offboard to OWC 40 via communicating device 34, if desired. This information may include, for example, the coordinates of haul machine 12b, a traction device speed and/or orientation, tool and/or actuator positions, status information (e.g., temperatures, velocities, pressures, gear ratios, etc.), and other information known in the art.

OC 36 may embody a single or multiple microprocessors, field programmable gate arrays (FPGAs), digital signal processors (DSPs), etc., that include a means for controlling operations of haul machine 12b in response to operator requests, built-in constraints, sensed operational parameters, and/or communicated instructions from OWC 40. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

OWC 40 may include any means for monitoring, recording, storing, indexing, processing, and/or communicating various operational aspects of worksite 10 and haul machine 12b. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

OWC 40 may be configured to execute instructions stored on computer readable medium to perform methods of travel path planning and control for machines 12 at worksite 10. That is, as described above, the operation of machines 12 may cause changes to the geography of worksite 10 and, in order for machines 12, particularly those machines that are autonomously controlled, to adapt to the changing geography, travel path plans for machines 12 should also change to keep up with the changes in terrain. OWC 40 may execute the instructions to perform a method of planning that generates travel paths 18, groupings 20, dump targets 22, entrance paths 24, exit paths 26, and other control aspects for machines 12, and communicates this information to the different control modules 30 for individual implementation. As will be explained in more detail below, OWC 40 may then manage movement of each haul machine 12b (and other machines 12) along the different travel paths to particular dump targets 22, and from dump targets 22 back to load location 14 after discharge of material.

FIG. 3-7 illustrate the planning methods performed by OWC 40. FIGS. 3-7 will be discussed in more detail in the following section to further illustrate the disclosed concepts.

Industrial Applicability

The disclosed control system may be applicable to a multi-machine, high-wall operation where the machines are controlled to dump their loads past a berm and over the edge of a steep incline. Although applicable to any type of machine, the disclosed control system may be particularly applicable to autonomous or semi-autonomous machines where the machines are automatically controlled to follow particular routes to assigned dump targets. The disclosed system may provide instructions for controlling each machine along its assigned route, and communicate the instructions in real time based on tracked machine position. Operation of control system 42 will now be described in detail.

The division of dump location 16 into groupings 20 (referring to FIG. 1) may be based on site characteristics, machine characteristics, and/or goals defined by a user of control system 42. The site characteristics may include, among other things, a traversable area at dump location 16, a contour of dump location 16, and/or a composition of material to be discharged at dump location 16. The machine characteristics may include, among other things, a payload capacity of haul machines 12b, a size of haul machines 12b, a turning radius of haul machines 12b, and/or an output capacity (torque, tractive, etc.) of haul machine 12b. The user-defined goals may include, among other things, a desired cycle time of haul machines 12b, a desired travel distance of each haul machine 12b, a desired fuel consumption or efficiency of each haul machine 12, and/or a desired number of simultaneously operating haul machines 12b.

In one example, the division of dump location 16 into groupings 20 may be manually completed. For example, a user, through an interface (not shown) at OWC 40, may define a boundary around dump location 1. The boundary may be defined at least partially based on survey information associated with an edge of a high-wall area. Then, based on a minimum required spacing for and between groupings 20, a desired number of dump targets 22, and other similar criteria, select or otherwise provide coordinates of first and second boundary markers 48, 59 for each grouping 20. After manual formation of groupings 20, information regarding groupings 20 may be provided to OWC 40 for further processing.

In another example, the division of dump location 16 into groupings 20 may be completed autonomously by OWC 40. Specifically, based on information provided by a user (e.g., the minimum required spacing for and between groupings 20, the desired number of dump targets 22, and other similar criteria) and utilizing one or more algorithms and/or maps stored in memory, OWC 40 may be configured to automatically determine a number, size, and location of each individual grouping 20 at dump location 16 such that a sufficient amount of material may be discharged at accessible and required locations by haul machines 12b to achieve the user-defined goals.

Groupings 20 may be generated before or after survey information of a boundary berm 44 at dump location 16 has been generated. This survey information may include, among other things, a location of an inward edge 46 of berm 44 also known as the berm toe, a width of berm 44, a height of berm 44, and/or a length of berm 44. In the disclosed embodiment, the survey is generated automatically as a service vehicle (not shown), equipped with position tracking components, travels along edge 46 of berm 44. It is contemplated, however, that the survey information may be generated in another manner, if desired. The survey information may be provided to OWC 40 for further processing.

Figure 3:
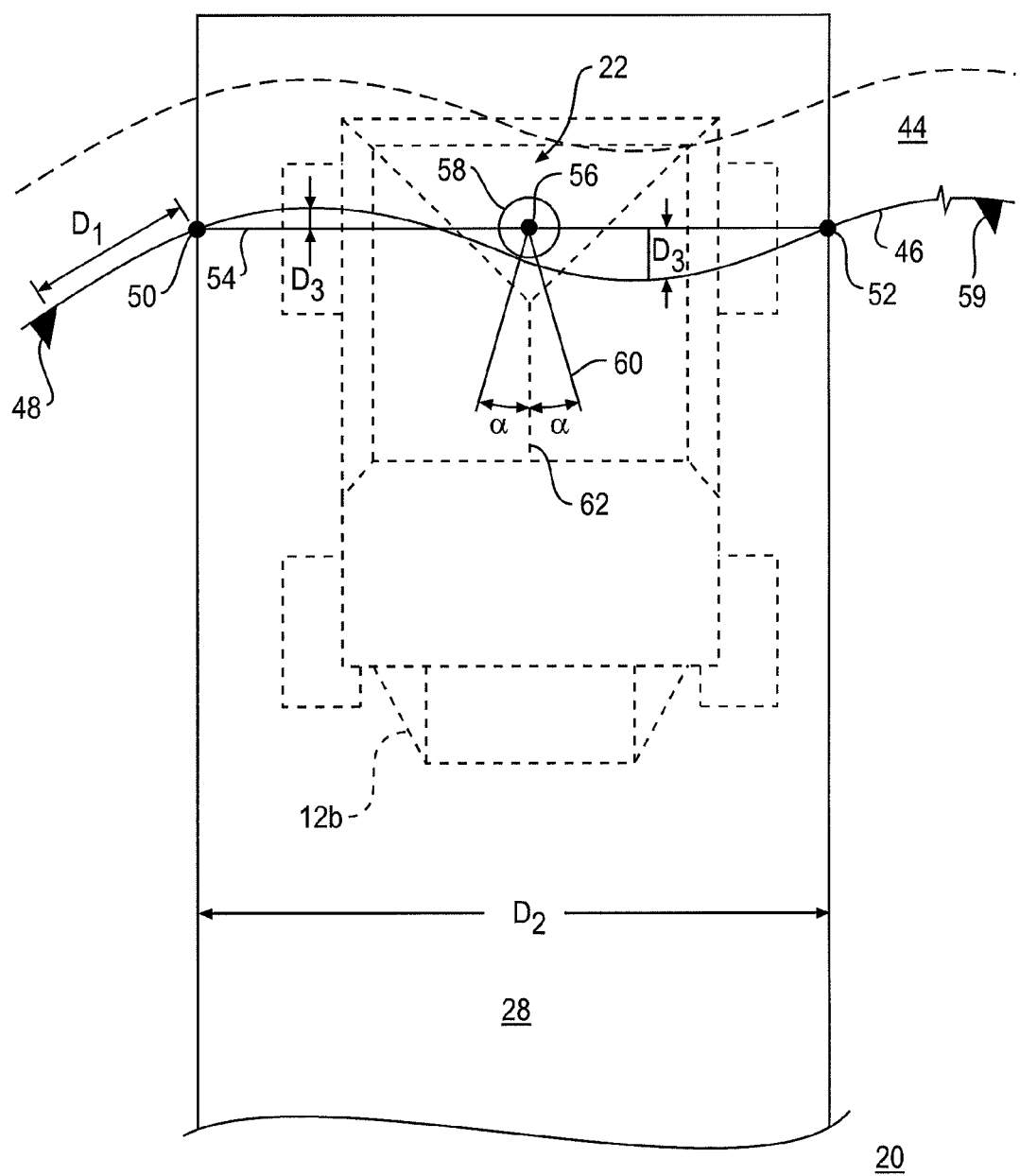
FIGS. 3 and 4 are diagrammatic illustrations of processes that may be completed by the control system of FIG. 2.
Figure 4:
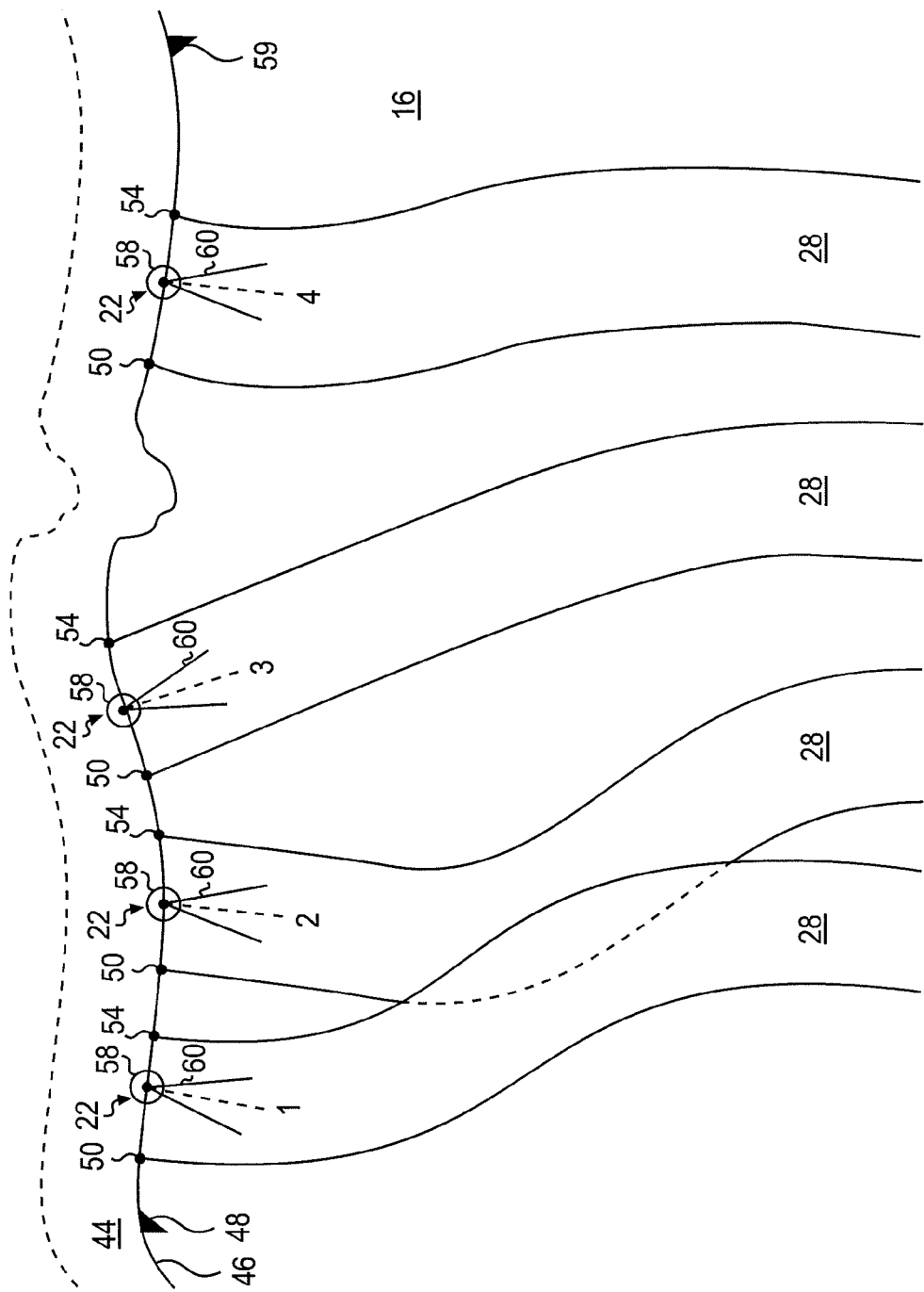
Figure 5:
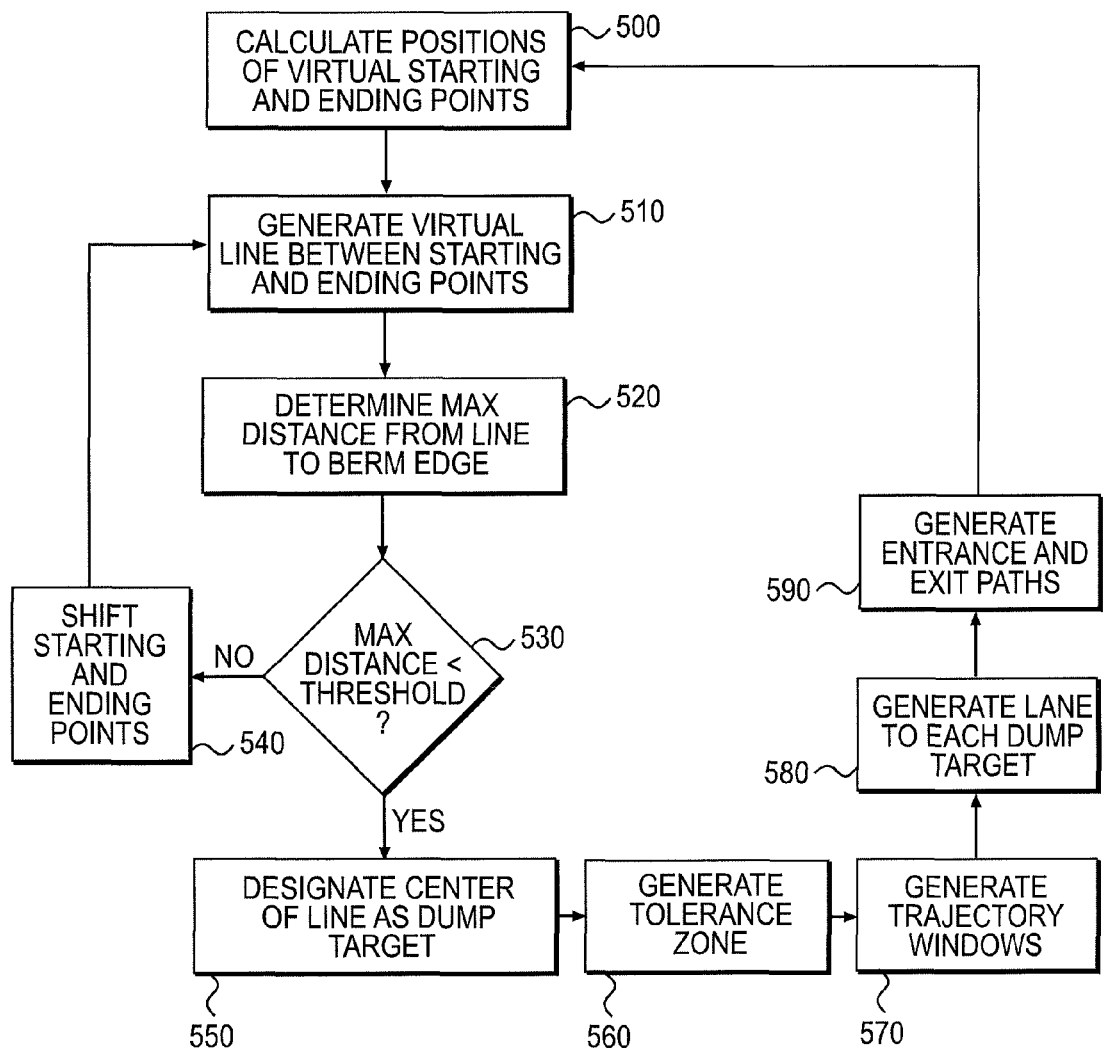
FIGS. 5-7 are flowcharts of the process associated with FIGS. 3 and 4.

As shown in FIGS. 3 and 5, OWC 40 may use the location of edge 46 and boundaries of a particular grouping 20 to determine the location of individual dump targets 22 within the grouping 20. Dump targets 22 may be virtual targets placed in the electronic representation of worksite 10 and having coordinates that correlate with actual physical locations at dump location 16. In particular, starting from a first virtual boundary marker 48 (i.e., a boundary marker in the electronic representation of worksite 10) of the particular grouping 20, OWC 40 may calculate the positions of a virtual starting point 50 and a virtual ending point 52 (Step 500). Starting point 50 may lie generally on edge 46 and be spaced apart from boundary marker 48 by a distance $D_1$ about equal to one-half of a width of haul machine 12b. Ending point 52 may also lie generally on edge 46 and be spaced apart from starting point 50 by a distance $D_2$ about equal to a width of lane 28. In one embodiment, the width of lane 28 may be about equal to 1.4-2 times the width of haul machine 12b.

OWC 40 may then draw or otherwise a virtual line 54 that extends between starting and ending points 50, 52 (Step 510). In some embodiments, line 54 may be located completely inward of edge 46 relative to dump location 16. In other embodiments, however, line 54 may cross edge 46 (shown in FIG. 3), such that a first portion of line 54 is located inward of edge 46 and a second portion of line 54 is located outward of edge 46. OWC 40 may then determine a maximum distance $D_3$ between line 54 and edge 46 within each of the first and second portions in a direction generally orthogonal to line 54 (Step 520), and compare the maximum distance $D_3$ to a threshold distance (Step 530). In one embodiment, the threshold distance may be about one meter. Other distances may alternatively be utilized.

When the maximum distance $D_3$ exceeds the threshold distance (step 530: No), starting and ending points 50, 52 are determined to be invalid. In this situation, both starting and ending points 50, 52 are shifted further away from boundary marker 48 by about the same amount (Step 540), line 54 is redrawn, and the maximum orthogonal distances $D_3$ are again measured and compared with the threshold distance. In the disclosed embodiment, starting and ending points 50, 52 are shifted by about one meter, although other shift amounts may alternatively be utilized. Invalid points are generally considered to be associated with a location not suited for dumping. Dumping in such a location could result in too much material being deposited inward of berm 44 and requiring time consuming cleanup operations, or a likelihood of damage occurring to berm 44.

When the maximum distance $D_3$ is less than the threshold distance (step 530: Yes), starting and ending points 50, 52 are determined to be valid. In this situation, a lengthwise center point 56 of line 54 may be designated as a dump target 22 by OWC 40 (Step 550), and a tolerance zone 58 may be generated around center point 56 (Step 560). In the disclosed embodiment, tolerance zone 58 may be two-dimensional and generally circular. It is contemplated, however, that other shapes may be used, if desired. A size of tolerance zone 58 may be determined based on an accuracy of locating device 32, an accuracy of the berm survey information, a size of haul machine 12b, a stopping capability of haul machine 12b, and/or other similar parameters.

Additional dump targets 22 may be established in similar manner. In particular, after generation of a first dump target 22, starting point 50 of a subsequent dump target 22 may be offset a distance (e.g., about one-half of a machine width) from ending point 52 of the first dump target. The process may then be completed in the same manner described above until all dump targets 22 within a particular grouping 20 have been established or until ending point 52 of a potential dump target 22 extends past a second boundary marker 59 of the particular grouping 22.

After a particular dump target 22 has been established, a trajectory window 60 may be generated that can be used as a tolerance zone to guide a particular haul machine 12b to dump target 22 (Step 570). Trajectory window 60 may be a triangularly-shaped virtual feature having an apex located at dump target 22 and an open-ended base located inward of and widening away from berm 44. The sides of trajectory window 60 may be symmetrically oriented away from a center line 62 by an angle α. Center line 62 may be generally orthogonal to line 54, and angle α may be about 10-20° (more specifically about 14°) in the disclosed embodiment. During control of haul machine 12b, as will be described in more detail below, a length-wise center of a rear axle of haul machine 12b should remain within trajectory window 60 (i.e., the coordinates of this point should continuously be compared with coordinates of the sides of trajectory window 60 and steering of haul machine 12b responsively corrected) during reverse travel toward dump target 22, and come to rest within tolerance zone 58 prior to haul machine 12b dumping its load. It is contemplated that trajectory window 60 may have another shape and/or that angle a may have another value, if desired.

OWC 40 may next generate one lane 28 leading to each established dump target 22 (see lanes 1-4 shown in FIG. 4) (Step 580), and entrance and exit paths 24, 26 that connect each lane 28 within a common grouping 20 to main travel path 18 (referring to FIG. 1) (Step 590). Each lane 28 may be generally aligned with center line 62 and extend at least to the associated dump target 22. In one embodiment, lane 28 may extend a distance past dump target 22 and, in this embodiment, the end thereof may function as an terminal boundary for machine travel. That is, under no circumstance will any portion of haul machine 12a be allowed to move past the end of lane 28, even if the lengthwise center of the rear axle has not yet reached its assigned coordinates. Entrance path 24 may lie generally parallel with exit path 26 and be located a space apart from exit path 26 to allow a haul machine 12b traveling on entrance path 24 to move into the space for a 3-point turn before backing down an assigned lane 28. It is contemplated that a portion of entrance and exit paths 24, 26 may overlap in some situations and/or that adjacent lanes 28 may overlap (see lanes 1 and 2 in FIG. 4), if desired. OWC 40 may determine the shapes, locations, dimensions, and/or curvatures of entrance and exit paths 24, 26 based on a size of and spacing between dump targets 22, a size and/or spacing of groupings 20, contours of dump location 16, and/or based on characteristics of haul machines 12b.

Lanes 28 may be generated in any number of different ways. For example, a generally rectangular virtual box (not shown) may be overlaid on virtual line 54, such that a leading end of the box is aligned with virtual line 54 and sides of the box are co-terminus with starting and ending points 50, 52. In another example, virtual side lines (not shown) may be drawn to extend from starting and ending points 50, 52 in parallel with center line 62. The length of the virtual box and/or the virtual side lines may vary and be at least partially dependent on characteristics of haul machines 12b and the particular application at worksite 10.

OWC 40 may be triggered to divide dump location 16 into groupings 20, establish lanes 28, establish dump targets 22, and/or generate the different travel paths to and from dump targets 22 based on any number of different site- and user-related input. For example, when cleanup machines 12c (referring to FIG. 1) change (i.e., increase, decrease, or reshape) an accessible area of dump location 16, OWC 40 may be triggered to divide or re-divide dump location 16 based on the new size or shape to accomplish the user-defined goals. Similarly, based on a comparison of expected dumping progress (e.g., expected shape, spacing, and/or size of loads dumped by haul machines 12b) to an actual shape, spacing, and/or size of dumped loads, OWC 40 may be triggered to update characteristics of groupings 20, dump targets 22, entrance path 24, and/or exit path 26 to help ensure accomplishment of the user-defined goals. Likewise, when the user-defined goals of material movement and/or contour change, OWC 40 may be triggered to modify characteristics of dump location 16.

After dividing dump location 16 into groupings 20, establishing dump targets 22, lanes 28, entrance path 24, and exit path 26, OWC 40 may execute instructions to regulate the movements of haul machines 12b relative to different routes that include these travel paths and targets. In the case of autonomously controlled machines 12, control modules 30 of the corresponding machines 12 may be instructed by OWC 40 to direct operations of machines 12 relative to the different travel paths and targets. In the case of manually controlled machines 12, control modules 30 of the corresponding machines 12 may cause routes of the different rows locations of the different targets to be displayed on the electronic terrain map provided on one of interface devices 38 (e.g., on the monitor of control module 30), with associated instructions for the machine operator. The electronic terrain map may be a compilation of data stored in the memory of OWC 40 and periodically updated with the changes made to dump location 16 and/or the locations of machines 12 provided by corresponding locating devices 32.

Figure 6:
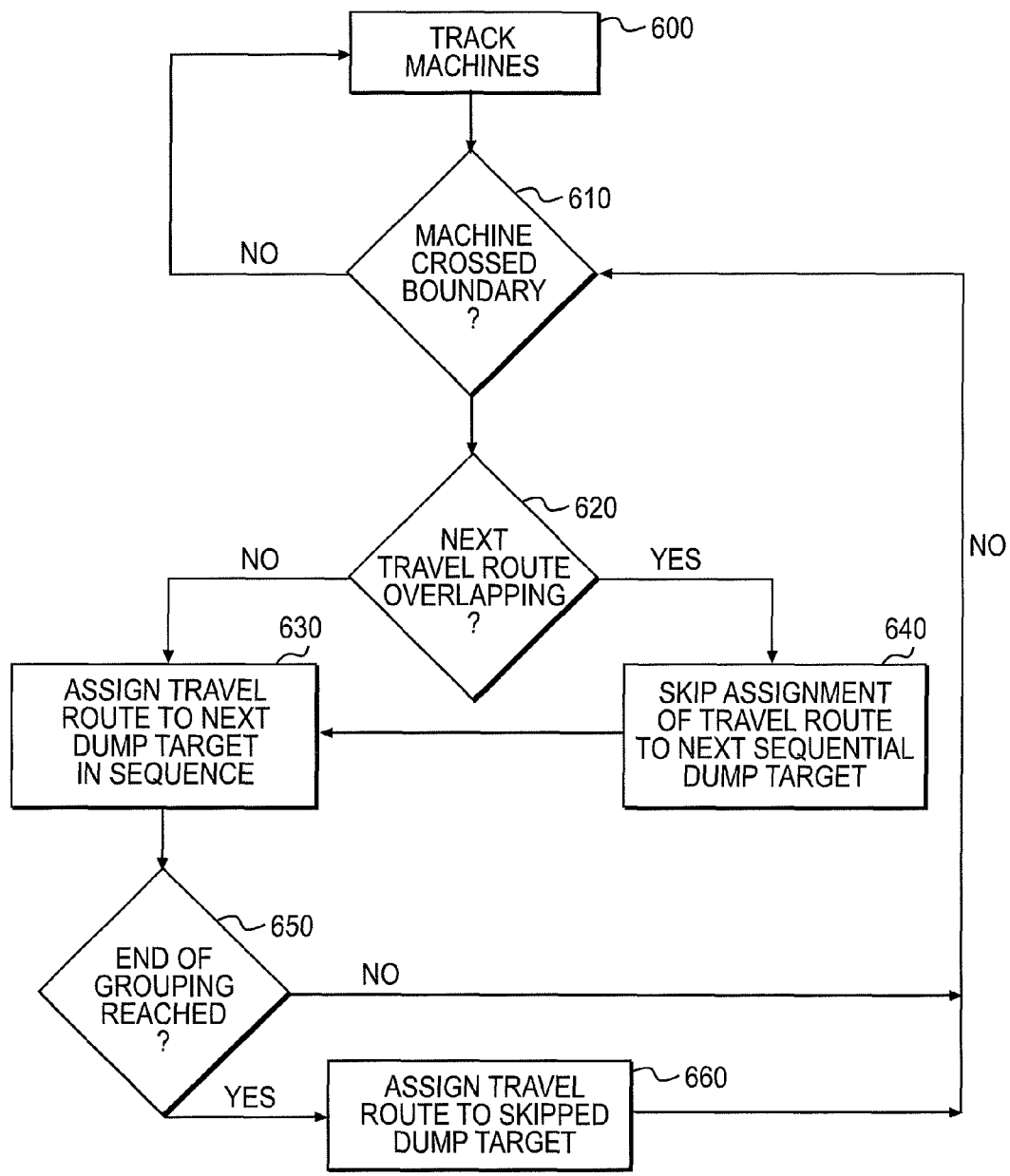

As shown in FIG. 6, control over the movement of haul machines 12b at dump location 16 may commence based on a proximity of haul machines 12b to dump location 16 and/or to dump targets 22. For example, as haul machines 12b are traveling towards dump targets 22, haul machines 12b will eventually cross a virtual boundary 64 (shown in FIG. 1) associated with dump location 16. The precise location of virtual boundary 64 may be set by the user of control system 42 and be associated with an amount of time required for OWC 40 to determine and assign a specific travel route within dump location 16 to a particular haul machine 12b before that particular haul machine 12b is required to deviate from a current heading to follow the specified travel route. In the disclosed embodiment, virtual boundary 64 may correspond with a location where the first entrance and exit paths 24, 26 diverge from main travel path 18. The location of each haul machine 12b may be tracked by OWC 40 based on signals received from the corresponding control module 30 (Step 600), and compared with the location of virtual boundary 64 as stored in the electronic representation of dump location 16 (Step 610).

Once OWC 40 determines that a particular haul machine 12b has crossed virtual boundary 64 (step 610: Yes), OWC 40 may determine, assign, and communicate the assigned travel route to that haul machine 12b. In the disclosed embodiment, no communication requesting assignment of the travel route may be required by haul machine 12b, and haul machine 12b may also not be required to stop to receive the assignment. In other words, assignment of the travel route may be automatically triggered based simply on the tracked position of haul machine 12b, and the assignment may be communicated to haul machine 12b on the fly without causing any disruption in the operation of haul machine 12b. The particular travel route assigned to a specific haul machine 12b may include designation of a particular grouping 20 at dump location 16 and assignment of a unique one of dump targets 22 within that grouping 20.

In groupings where lanes 28 overlap, care should be taken in assignment of particular dump targets 22. For example, in order to allow multiple haul machines 12b to access dump targets 22 within the same grouping 20 at the same time, adjacent overlapping lanes 28 should not be assigned to consecutive haul machines 12b. Accordingly, OWC 40 may be configured determine if the travel route extending to the next sequential dump target to be assigned overlaps with another travel route (Step 620) and only assign that dump target 22 if no overlapping exists (Step 330). That is, OWC 40 may be configured to assign sequential lanes 28 leading to sequential dump targets 22 to consecutive haul machines 12b based on the order that they arrive at dump location 16, but only when lanes 28 do not overlap. Otherwise, when lanes 28 within the same grouping 20 overlap, OWC 40 may instead be configured to assign one of the dump targets 22 associated with the overlapping lanes 28, and skip assignment of the other associated dump target 22 (Step 640). OWC 40 may then determine if the end of the particular grouping 20 of dump targets 22 has been reached (Step 650). After reaching the sequential end of dump targets 22 of the particular grouping 20, OWC 40 may assign any previously skipped dump targets 22 (Step 660) before repeating the cycle of assignments. It should be noted that other strategies for assignment may alternatively be utilized, if desired.

OWC 40 may track the progress of haul machine 12b along an assigned route at dump location 16. Specifically, after being assigned a particular dump target 22, haul machine 12b may be autonomously or manually controlled via control module 30 to follow a unique route, while at the same time providing location information regarding its whereabouts to OWC 40. During this control, haul machine 12b may be backed down its assigned lane 28 toward its assigned dump target 22, keeping the center point of the rear axle of haul machine 12b within trajectory window 60 and slowing as dump target 22 is neared. Haul machine 12b may continue in the course until the center point crosses into tolerance zone 58. At this point in time, the speed of haul machine 12b may be further reduced to below a maximum acceptable threshold (i.e., autonomous braking of haul machine 12b may be increased). In the disclosed embodiment, the maximum acceptable threshold within tolerance zone 58 may be about 2.8 mph, although other speeds may alternatively be utilized. The speed of haul machine 12b may be reduced automatically via control module 30 or manually by an operator in response to instructions from control module 30, as desired.

Figure 7:
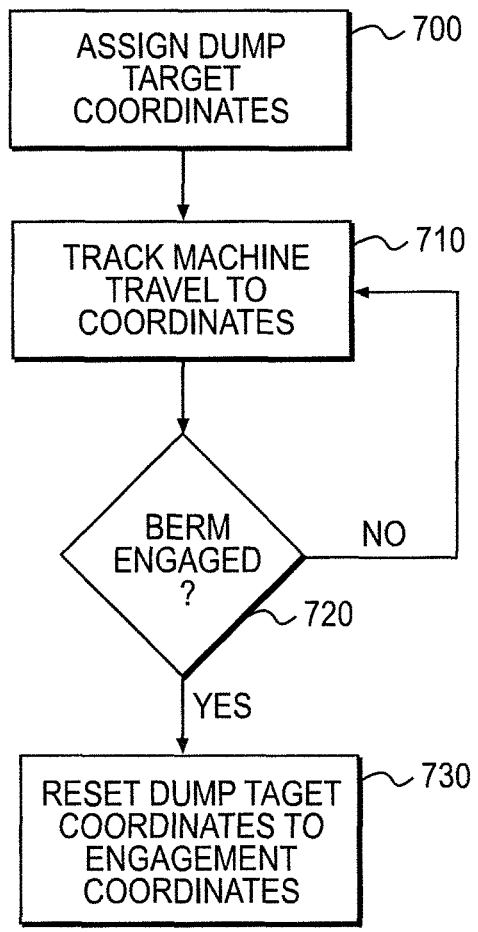

Different haul machine 12b may be controlled differently within tolerance zone 58 depending on the number of dumping events that have already been completed at the particular dump target 22. In particular, as shown in FIG. 7, OWC 40 may assign coordinates (as determined above) for a particular dump target 22 (Step 700) to a first haul machine 12b designated for initial use of that particular dump target 22. The location of this first machine 12b may be tracked by OWC 40 (Step 710) during reverse travel through tolerance zone 58 until engagement of (i.e., contact with) berm 44 is detected (Step 720). In some embodiments, this reverse travel may continue even after center point 56 has been passed.

Detection of the engagement of the first haul machine 12b with berm 44 can be accomplished in many different ways. For example, one or more ranging (e.g., LIDAR or RADAR) or camera type sensors 66 may be associated with each haul machine 12b and configured to recognize the shape and thereby detect the location of berm 44. Alternatively or additionally, one or more acceleration sensors may be associated with each haul machine 12b and used to detect a sudden deceleration caused by the engagement. In another example, signals from a pitch sensor and/or another type of sensor may be utilized. Other ways of detecting the engagement may also be possible.

Once engagement of the first haul machine 12b with berm 44 has been detected (Step 720: Yes) during the first visit to the particular dump target 22, the coordinates of the corresponding dump target 22 may be reset to the location of the center point of the rear axle of the first haul machine 12b at the time of engagement (Step 730). Every dump event achieved thereafter by the same or any other haul machine 12b at the same dump target 22 may then be controlled relative to the new coordinates. In this manner, all haul machines 12b, during all subsequent visit to the same dump target 22, may not be required to engage berm 44. Instead, each haul machine 12b may be controlled to come to a slow and complete stop at the new coordinates, which should place each haul machine 12b at the toe of berm 44.

The initial engagement of the first haul machine 12b to visit a particular dump target 22 with berm 44 may help to confirm the location of berm 44. That is, until the first haul machine 12b actually engages berm 44, the toe location of berm 44 may only be an estimated location. The engagement of the first haul machine 12b establishes an actual toe location of berm 44, which can then be used for all subsequent visits to the particular dump target 22. By using an actual toe location instead of an estimated location, all subsequent haul machines 12b to visit the particular dump target 22 may be controlled to stop at the toe of berm 22 without impacting berm 22 with significant force. High-force impacts could cause damage to berm 22, resulting in instabilities. In addition, using the actual toe location may help to prevent dumping inside of berm 44, thereby reducing the efforts expended by cleanup machines 12c to maintain dump location 16.

In some embodiments, each dump target 22 may be used a finite number of times. Accordingly, when OWC 40 detects movement of haul machine 12b away from the assigned dump target 22, OWC 40 may conclude that dumping has been completed successfully and tabulate the number of completed dump events at the particular dump target 22. And upon reaching an allowed number of dump events for a particular dump target 22, OWC 40 may cease to assign haul machines 12b to that dump target 22. Similarly, when all dump targets 22 within a particular grouping 20 have been used the desired number of times, OWC 40 may cease routing haul machines 12b to that grouping 20. The number of times that a particular dump target 22 is utilized may be determined by a user of control system 42 or automatically by OWC 40 based on any number and type of input. OWC 40 may continuously update the status of individual dump targets 22 and groupings 20 in the electronic representation of worksite 10 based on the progress of haul machines 12b.

In some embodiments, haul machine 12b may be controlled differently during the last dumping event at a particular dump target 22. For example, when a dumping event is designated as the final event at a dump target 22, haul machine 12b may be controlled to perform a capped dump. When capping a dump, haul machine 12b may move in a forward direction away from berm 44 while material is being discharged. This movement may result in the final load of material being dumped at least partially inside of berm 44 along the trajectory of haul machine 12b. This material may physically mark that the particular dump target 22 is closed, while also leaving behind material that can be used to repair berm 44 for future use.

Although assigned a unique travel route to a particular dump target 22 within a specific grouping 20, a haul machine 12b, in some situations, may not have permission to complete travel along the entire route. That is, the layout of dump location 16 may be designed for simultaneous use by multiple haul machines 12b and, accordingly, it may be possible for travel routes to overlap at some point in time. Accordingly, during the tracking of progress made by different haul machines 12b along their assigned travel routes, OWC 40 may be configured to determine a potential for collision at an intersection of main travel, entrance, and/or exit paths 18, 24, 26. When such a potential exists, OWC 40 may give permission to a particular haul machine 12b for travel along its route only up to a specified point, for example up to a particular intersection. If a haul machine 12b reaches the specified point before additional permissions are provided by OWC 40, that haul machine 12b may be required to stop and wait for the additional permissions before entering the intersection. Once the potential for collision no longer exists (e.g., once another haul machine 12b has passed by the intersection), OWC 40 may provide permission for the particular haul machine 12b to continue travel along its assigned route up to another point of potential collision. If no potential collisions exist, haul machine 12b may follow its entire travel route and head back to load location 14 without further communications with OWC 40 (i.e., other than to provide its position).

During use of dump location 16, some maintenance may be periodically required. For example, it may be possible for material to fall from haul machines 12b at locations inward of berm 44. Additionally, surface conditions at particular locations may degrade through heavy use to a point where continued use could damage haul machine 12b or not even be possible. At these times, OWC 40 may be alerted of the need for maintenance and OWC 40 may selectively lock out particular dump targets 22 or particular groupings 20 for assignment to haul machines 12b. This alert may be generated by the human operators of cleanup machines 12c or detected automatically via sensors (not shown) mounted onboard haul machine 12b. OWC 40 may maintain the lockout until notified that the deteriorated conditions have been addressed.

Control system 42 may be simple and efficient. In particular, the disclosed system may rely on relatively simple calculations and algorithms to determine locations of potential dump targets and to validate the locations. This may allow for a reduction in time-consuming computations and for the use of less expensive processing components. In addition, because control system 42 may validate each dump target before assigning the target for use by an autonomous machine, the likelihood of the machine discharging its load at a desired location may be increased. Accordingly, the need to cleanup material that has been discharged at an undesired location may decrease. It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A control system for use with a plurality of machines operating at a worksite, the control system comprising:
a plurality of communicating devices, each mountable to a different one of the plurality of machines;
a plurality of onboard controllers, each mountable to a different one of the plurality of machines; and
an offboard controller in communication with the plurality of onboard controllers via the plurality of communicating devices, the offboard controller configured to:
selectively assign each of a plurality of sequentially arranged dump targets for use by each of the plurality of machines based on an order in which the plurality of machines arrive at a dump location;
make a determination that lanes extending to two dump targets of the plurality of sequentially arranged dump targets overlap; and
selectively skip assignment of one of the two dump targets based on the determination.

2. The control system of claim 1, wherein the offboard controller is further configured to assign the one of the two dump targets after assignment of a remaining number of the plurality of sequentially arranged dump targets.

3. The control system of claim 2, wherein the offboard controller is further configured to restart assigning each of the plurality of sequentially arranged dump targets for use by each of the plurality of machines based on the order in which the plurality of machines arrive at the dump location after assignment of the one of the two dump targets.

4. The control system of claim 1, wherein the offboard controller is further configured to track a number of times that each of the plurality of sequentially arranged dump targets receives a load of discarded material.

5. The control system of claim 4, wherein the offboard controller is further configured to:
receive input indicative of a desired number of loads to be discarded at each of the plurality of sequentially arranged dump targets; and
when the number of times that a particular one of the plurality of sequentially arranged dump targets receives a load of discarded material reaches the desired number of loads, selectively inhibit further assignment of that particular one of the plurality of sequentially arranged dump targets.

6. The control system of claim 4, wherein the offboard controller is further configured to communicate instruction to the plurality of onboard controllers to cap dump a final load of material at each of the plurality of sequentially arranged dump targets.

7. The control system of claim 1, wherein the offboard controller is further configured to:
receive input indicative of a desire to clean up the dump location; and
selectively inhibit assignment of all dump targets associated with a common grouping of the plurality of sequentially arranged dump targets based on the input.

8. The control system of claim 7, wherein:
the common grouping is a first common grouping; and
the offboard controller is further configured to assign dump targets associated with a second common grouping of the plurality of sequentially arranged dump targets when assignment of the first common grouping is inhibited.

9. The control system of claim 1, wherein the offboard controller is further configured to instruct each of the plurality of onboard controllers to autonomously cause the associated plurality of machines to traverse travel paths to and discard material at the plurality of sequentially arranged dump targets based on the assignment.

10. A method of controlling a plurality of machines operating at a worksite, comprising:
selectively assigning, using a processor, each of a plurality of sequentially arranged dump targets for use by each of the plurality of machines based on an order in which the plurality of machines arrive at a dump location;

making a determination that lanes extending to two dump targets of the plurality of sequentially arranged dump targets overlap; and selectively skipping assignment of one of the two dump targets based on the determination.

11. The method of claim 10, further including assigning the one of the two dump targets after assignment of a remaining number of the plurality of sequentially arranged dump targets.

12. The method of claim 11, further including restarting assignment of each of the plurality of sequentially arranged dump targets for use by each of the plurality of machines based on the order in which the plurality of machines arrive at the dump location after assigning of the one of the two dump targets.

13. The method of claim 10, further including tracking a number of times that each of the plurality of sequentially arranged dump targets receives a load of discarded material.

14. The method of claim 13, further including:

receiving input indicative of a desired number of loads to be discarded at each of the plurality of sequentially arranged dump targets; and when the number of times that a particular one of the plurality of sequentially arranged dump targets receives a load of discarded material reaches the desired number of loads, selectively inhibiting further assigning of that particular one of the plurality of sequentially arranged dump targets.

15. The method of claim 14, instructing each of the plurality of machines to cap dump a final load of material at each of the plurality of sequentially arranged dump targets.

16. The method of claim 10, further including:

receiving input indicative of a desire to clean up the dump location; and selectively inhibiting assigning of all dump targets associated with a common grouping of the plurality of sequentially arranged dump targets based on the input.

17. The method of claim 16, wherein:

the common grouping is a first common grouping; and the method further includes assigning dump targets associated with a second common grouping of the plurality of sequentially arranged dump targets when assignment of the first common grouping is inhibited.

18. A non-transitory computer readable medium having executable instructions stored thereon for causing a computer to perform a method of controlling a plurality of machines at a worksite, the method comprising:

selectively assigning each of a plurality of sequentially arranged dump targets for use by each of the plurality of machines based on an order in which the plurality of machines arrive at a dump location;

making a determination that lanes extending to two dump targets of the plurality of sequentially arranged dump targets overlap;

selectively skipping assignment of one of the two dump targets based on the determination;

assigning the one of the two dump targets after assignment of a remaining number of the plurality of sequentially arranged dump targets; and restarting assignment of each of the plurality of sequentially arranged dump targets for use by each of the plurality of machines based on the order in which the plurality of machines arrive at the dump location after assigning of the one of the two dump targets.

19. The non-transitory computer readable medium of claim 18, wherein the method further includes:

tracking a number of times that each of the plurality of sequentially arranged dump targets receives a load of discarded material;

receiving input indicative of a desired number of loads to be discarded at each of the plurality of sequentially arranged dump targets; and when the number of times that a particular one of the plurality of sequentially arranged dump targets receives a load of discarded material reaches the desired number of loads, selectively inhibiting further assigning of that particular one of the plurality of sequentially arranged dump targets.

20. The non-transitory computer readable medium of claim 18, wherein the method further includes:

receiving input indicative of a desire to clean up the dump location;

selectively inhibiting assigning of all dump targets associated with a first common grouping of the plurality of sequentially arranged dump targets based on the input; and assigning dump targets associated with a second common grouping of the plurality of sequentially arranged dump targets when assignment of the first common grouping is inhibited.

* * * * *

UNITED STATES PATENT AND TRADEMARK OFFICE
CERTIFICATE OF CORRECTION

PATENT NO. : 8,880,334 B2  Page 1 of 1
APPLICATION NO. : 13/752262
DATED : November 4, 2014
INVENTOR(S) : Kini et al.

It is certified that error appears in the above-identified patent and that said Letters Patent is hereby corrected as shown below:

Title Page, column 1, Item 72 (Inventors), line 1, delete "Anath P. Kini," and insert
-- Ananth P. Kini, --.

In the specification

Column 5, line 8, delete "Industrial Applicability" and insert -- INDUSTRIAL APPLICABILITY --.

Signed and Sealed this
Twenty-fourth Day of November, 2015

Michelle K. Lee
*Director of the United States Patent and Trademark Office*